United States Patent [19]

Otto

[11] Patent Number: 5,778,060
[45] Date of Patent: Jul. 7, 1998

[54] WORK AT HOME ACD AGENT NETWORK WITH COOPERATIVE CONTROL

[75] Inventor: Mary Rita Otto, Lisle, Ill.

[73] Assignee: AT&T Corp., Middletown, N.J.

[21] Appl. No.: 635,141

[22] Filed: Apr. 19, 1996

[51] Int. Cl.[6] .................................................. H04M 7/00
[52] U.S. Cl. ............................................ 379/265; 379/207
[58] Field of Search .............................. 379/201, 210, 379/207, 265, 266

[56] References Cited

U.S. PATENT DOCUMENTS

| | | | |
|---|---|---|---|
| 5,036,535 | 7/1991 | Gechter et al. | 379/210 |
| 5,062,103 | 10/1991 | Davidson et al. | 379/265 |
| 5,392,345 | 2/1995 | Otto | 379/265 |
| 5,572,584 | 11/1996 | Yabusaki et al. | 379/265 |

OTHER PUBLICATIONS

AT&T Network Systems Brochure 235-300-070: 5ESS® Switch ACD/MIS Issue 2, Aug. 1990, pp.11-19.

*Primary Examiner*—Daniel S. Hunter

[57] ABSTRACT

A method and apparatus for adapting a switch arranged to provide automatic call distributor (ACD) service from remote agent stations as well as local agent stations. The remote agent stations are served by a switch other than the switch serving the ACD. The remote agent stations are connected by a data connection for transmitting agent status information to the ACD switch. The data connection is terminated on a server system for maintaining agent status information for the remote agents. When the ACD requests an identity of an available remote agent station, that identity is supplied by the server system. Advantageously, the server system can be programmed to select among available remote agent's stations in accordance with the wishes of the ACD customer. Advantageously, this arrangement allows remote agents to serve ACD callers in essentially the same way as local agents serve these callers, thus, permitting the remote agent to work at different locations including, for example, their homes, while also permitting the owner of the ACD to take advantage of special characteristics or knowledge of selected remote agents.

24 Claims, 6 Drawing Sheets

WORK AT HOME ACD AGENT NETWORK WITH COOPERATIVE CONTROL

TECHNICAL FIELD

This invention relates to arrangements for allowing physically separated agents to work as members of an automatic call distributor (ACD) team serving as part of a call center.

PROBLEM

The revolution in telecommunications is starting to make it possible to realize an old dream, that of being able to work as effectively from a home as from an office. Many people, especially in the computer industry, are able to complete a large part of their work from workstations or personal computers in their home. Sofar, however, such applications as permitting call center agents to work from their homes have not achieved wide acceptance. Generally, it has been difficult to maintain adequate supervision of such agents (e.g. recording the number of toll calls made by the agents), the telecommunications tools available to remote agents are inadequate or too costly, and the cost of providing telecommunications access to such agents has been sufficiently high to discourage the practice.

One proposed solution to this problem is described in U.S. Pat. No. 5,392,345 issued to the inventor of the present invention. A drawback of this proposal which has limited its commercial appeal is the inability of the owner of the ACD that serves the call center to exercise specialized control over the selection of calls to the remote agents. Accordingly, a problem of the prior art is that there is no satisfactory arrangement for allowing telephone agents that are part of an automatic call distributor team to be physically separated from the other members of the team and to allow for special selection of such agents under the control of the owner of the ACD.

SOLUTION

This problem has been solved and an advance made over the prior art in accordance with the principles of this invention wherein a remote agent station, selected by a server system to serve a call to the ACD, is connected to the caller via an audio link through the public switched telephone network to the ACD switch; the server system maintains a record of the status of remote agents and in response to a request from the ACD system for the identity of an available remote agent, selects a remote agent that is available according to the status records of the server system. The remote agent station is connected to the server system, which is connected to the ACD switch, by a separate data connection; the remote agent station communicates via the data connection to the server system to log on, to log off, and to transmit such specialized status information as unavailability to handle new calls even though the station may be logged on and on hook. In accordance with one preferred embodiment of the invention, the server system receives information from the ACD system concerning a call for which a remote agent is sought and the server system selects a remote agent station according to availability of agents and according to the nature of the call (e.g., the directory number of the caller).

In accordance with one preferred embodiment of the invention, the server system comprises a data application computer for handling log on and log off operations and a call management application server responsive to log on, log off, on hook and off hook messages from the computer for maintaining status information, and for communicating with the switch in order to receive requests for the identity of an available agent station and to respond to such requests, and to notify the ACD system that remote agents are available. The computer is connected to the ACD switch in order to receive the data messages from the remote agent station and the server is connected to the ACD switch to communicate with the ACD switch for the purpose of selecting an available remote agent station. The computer and server are connected in order to exchange event information and in order to update the status record in the server. Alternatively, the function can be accomplished by call management server application running on the data application computer. Advantageously, these arrangements allow the owner of the ACD who may control the software being used for the server system to control the system for selection of remote agents.

DETAILED DESCRIPTION

Figure 1:
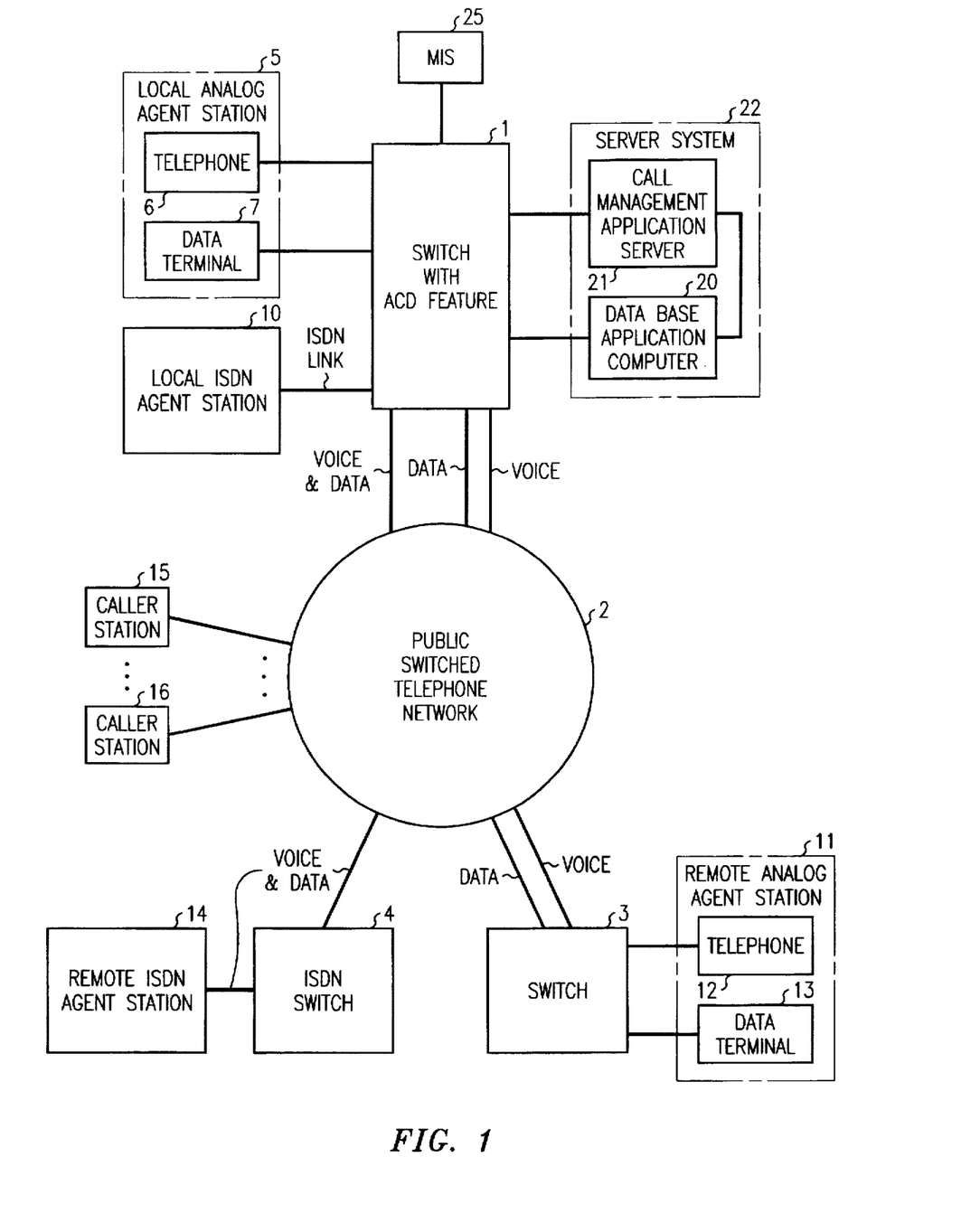
FIG. 1 is a block diagram illustrating the operation of applicant's invention.

FIG. 1 is a block diagram illustrating the operation of applicant's invention. Local agent station 10 and remote agent station 11 are both agent stations of an ACD. The ACD is implemented on a switch 1 having and ACD feature. An example of such a switch is the 5ESS® switch manufactured by AT&T Network Systems and in this case, adapted with the PINNACLE® feature to serve ACDs.

The local agent station 10 in this preferred embodiment is an integrated services digital network (ISDN) station which transmits a combined voice and data signal to switch 1. The voice signal is used for the connection to a caller such as caller station 15 of the set of caller station 15, . . . . 16 connected on a call through the public switched telephone network (PSTN) to switch 1; the channel carrying the data signal is connected as a signaling channel to the control of the switch, and as a data channel to data base application computer 20 which also serves the ACD for such purposes as recording customer orders, providing customer information to the agent station, providing product information to the agent station, and performing management information services computer 20 also supports data communications applications. In an alternative embodiment, the display terminals of the local agents are connected todata base application computer 20 by a local area network or any broader data network, even an Internet access provider.

ISDN local agent station 10 is served by switch 1 while remote analog agent station 11 is served by switch 3. An ACD call to switch 1 is extended across public switched telephone network (PSTN) 2 to switch 3 for connection to remote agent 11. Remote analog agent station 11 comprises analog telephone station 12 and a data terminal 13, probably including a display (not shown). Other local agent stations, such as local analog agent station 5, comprising analog telephone 6 and data terminal 7 are also directly connected to switch 1. Other remote agent stations such as ISDN remote agent station 14 are connected via switch 4 or any other serving switch (not shown) to public switched telephone network 2 which is connected to switch 1.

Also connected to switch 1 is a server system 22 comprising, in the preferred embodiment, a data application computer 20 and a call management application server 21. One example of a data application computer which will perform this function is the Sun SS5 computer. The IBM Call Path® software on an IBM RS6000 computer can perform the function of the call management application server 21. The data base application computer 20 communicates with data terminal 13 of the remote agent station 11, with ISDN remote agent station 14, and with local agent stations 10 and 5, and the call management application server 21 communicates with the control program of the ACD function of switch 1. The data base application computer 20 receives log on requests from remote agent stations 11 and 14. It also receives data messages representing other agents status indications such as log off or unavailability for serving new calls;unavailability may represent an agent busy on wrapup work.

The data connection between data base application computer 20 and data terminal 13 is a two way connection since the log on procedure involves an exchange of information; the data base application computer 20 may also provide to the agent station product information or customer information, normally provided by a "host computer", to help the agent perform the work necessary for successfully interacting with a caller. The data base application computer may also receive order information from the remote agent station data terminal 13 as well as requests for customer and/or product information. The data base application computer 20 passes status change information to call management application server 21 in order to permit the latter to maintain a record of the status of each remote agent station so that it can select an available agent station.

In an alternative embodiment, a separate host computer can be used for the customer, order and product information, and to record orders. In the preferred embodiment, data base application computer 20 is used for these functions.

The call management application communicates with the ACD control of switch 1 to receive requests for the identity of an available remote agent station to provide indications that remote agents are available, and, in response to a specific request, to provide an identification of an available remote agent station for the ACD to establish the connection. When the connection has been established through the public switched telephone network 2 and switch 3, the data base application computer 20 can direct call management application server 21 to supply customer information to the agent station.

Subsequently, the agent station can request data base application computer 20 to supply additional customer information and product information as needed.

The remote analog agent station comprises a telephone station 12 for audio communications with callers and a data terminal 13 for communications with data application computer 20. The data terminal establishes a data connection, such as a dial-up modem data connection, to switch 1. Eventually the data terminal 13 may be combined with a telephone instrument that replaces unit 12 12 in a combined personal computer (PC)/telephone instrument using PC ISDN circuit cards. The data connection stays up from log on to log off; the audio connection to the caller stays up for the duration of the call, or can stay up for more than one call if the next call is already in a queue. Anser and disconnect signals are sent over the audio path or as common channel signals for the audio path. Agent status signals are sent to the server system over the data path.

Also connected to switch 1 is a management information system (MIS) 25 for maintaining statistics concerning ACD performance. These statistics may include data relating to call answer delay, abandoned incoming calls, performance of individual agents, and data concerning outgoing calls made by the agent. The MIS receives inputs from the ACD related to local agents and from data base application computer 20 related to remote agent A Sun 51000E computer can be used for the MIS function. The management information system 25 for the ACD maintains a record of calls to/from each remote agent station as well as each local agent station, for management information purposes.

A caller station that initiates an ACD call on the station 15 is connected via the public switched telephone network (PSTN) 2 to switch 1 (or, in special cases, is already directly connected to switch 1); switch 1 then uses the ACD feature to select an agent station 10 or to request the identification of an available remote agent station from call management application server 21. If the call management application server 21 provides the identity of a remote agent station such as remote agent station 11, then switch 1 will extend a call to the remote agent station telephone 12 and when that call is completed will complete the connection from the caller station to the connection to the remote agent station's telephone. Alternatively, switch 1 can simply reroute the call to the remote agent station's telephone. Control of the remote agent station 11's side of the call is in switch 3 which detects disconnect signals or detects requests for three way connections or for call waiting connections.

In accordance with the preferred embodiment, if, at the time the call management application server notifies switch 1 of the availability of an agent, there are several calls in the queue for that ACD in switch 1, then switch 1 can transmit to call management application server 21 the information concerning several such calls in the queue. The call management application server 21 then supplies the switch 1 ACD control with a list of one or more calls to be served by remote agents and the identity of the remote agent for serving each call. Note that the software in call management application server 21 need not select the oldest call in the queue if there is a call recognized by that software as having higher priority. In an alternative embodiment, the information required for making a selection among the calls in the queue is maintained in data base application computer 20; disadvantage of such an arrangement is that response time is adversely affected.

The call management application server can receive status information concerning the number of available local agents, and can use this information in deciding whether to provide an identity of an available remote agent system. For example, the call management application server may decide that under the present load level, if only one remote agent station is available, and three local agent stations are available, a local agent should handle the call; in that case, it simply does not provide the identity of the available remote agent station or provides some other prearranged status message to indicate availability with a preference for using local agents.

Figure 2:
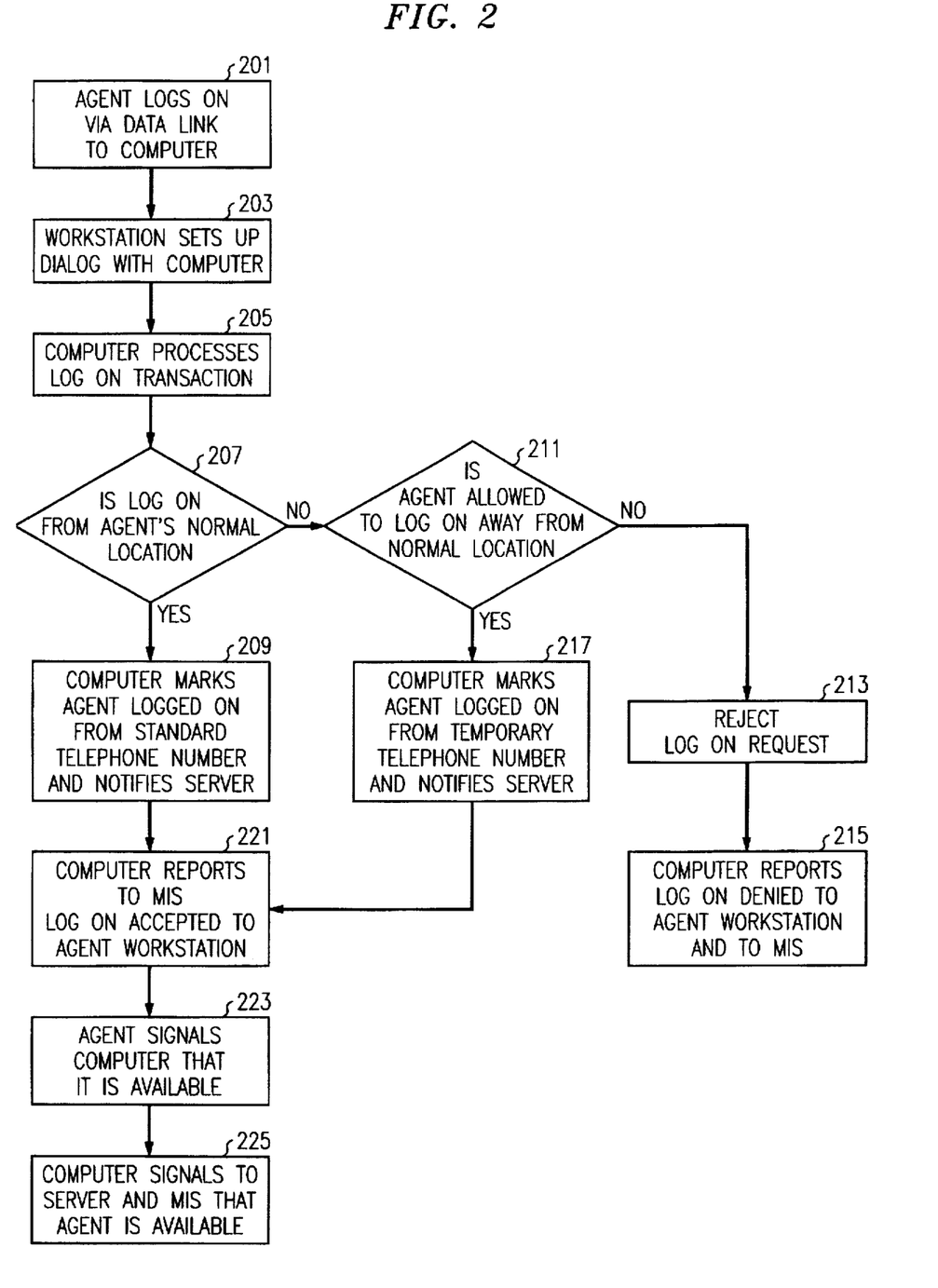
FIGS. 2–5 are flow diagrams illustrating the method of applicant's invention.

FIG. 2 is a flow diagram of the process of logging on from a remote agent station 11. The agent logs on via the data link to the data base application computer 20 (action block 201). The agent station sets up a dialogue with the data base application computer (action block 203). The data base application computer processes the log on transaction (action block 205). In test 207, it is determined whether the log on call is from the agent's normal location. If so, the data base application computer marks the agent logged on the standard telephone number and informs call management application server 21 (action block 209). If the log on is not from th agent's normal location (negative result of test 207), then test 211 is used to determine if the agent is allowed to log on from an alternate location. If not, then the log on request is rejected (action block 213) and the data base application computer reports a log on denied to the agent station and the management information system (MIS) 25 (action block 215). If the agent is allowed to log on from an alternate location (positive result of test 211), then the data base application computer marks the agent logged on and records the temporary telephone number for that agent, and informs the call management application server (action block 217). Following the execution of either action block 209 or 217, the data base application computer reports log on accepted to the agent's station and informs the MIS (action block 221). When the agent is ready, the agent then signals the data base application computer that the agent station is available (action block 223). The data base application computer then signals the call management application server and the MIS that the agent station is available (action block 225).

Figure 3:
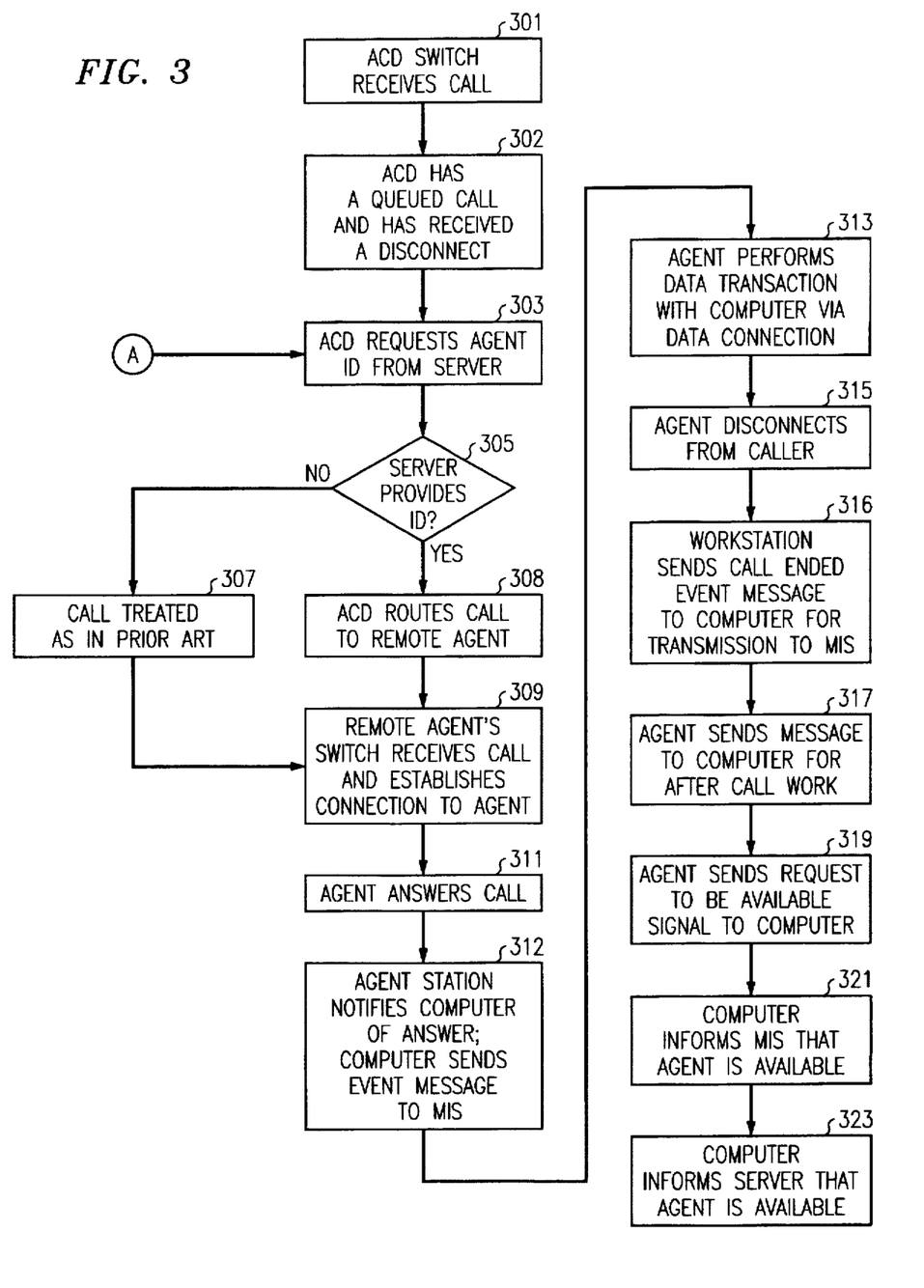

FIG. 3 is a flow diagram illustrating the processing of a call that may be routed to a remote agent station. The ACD switch receives a call for an agent of that ACD (action block 301) or the ACD has a least one queued call and has received a disconnection (action block 302). The ACD decides that this is a call that can be served from a remote agent station, and requests the call management application server to supply the identity of an available remote agent (action block 303). The decision of action block 303 is based on parameters stored in the ACD switch, and controlled by a supervisor of the ACD. These parameters include time of day, day of week, and local and remote call loads versus number of available local and remote agents. These parameters are compared with the current levels of loads for local and remote agents and the current availability of both types of agents. The object is to get a general balancing of load sent to remote agents or served by local agents, consistent with the policy of the ACD owner for serving its customers.

In addition, the ACD can be programmed to request service by a remote agent or to avoid such a request based on the identity of the caller; this may be for reasons of geographic proximity (and special knowledge by remote agents) or for service to specially selected ACD customers. Test 305 determines whether the call management application server has provided the identity of such an agent station. If not, then the call is processed by the ACD as in the prior art (action block 307). If an agent station identity has been provided (positive result of test 305), then the ACD routes the call to the identified remote agent station (action block 308). The remote agent station's switch 2 receives the call and establishes the connection to that agent (action block 309). The agent answers the call (action block 311), and provides an event message to the data application computer which informs the MIS 25 and switch 1 (action block 312). The agent then talks to the caller and performs data transactions with the data application computer 20, acting as a host computer, via the data connection (action block 313).

Eventually, the agent disconnects from the caller (or vice versa) (action block 315). The agent station sends a call ended event message to the data application computer which informs the MIS and the switch of this event (action block 316). The agent then continues to send messages to the data application computer for after call work (action block 317). This after call work is in the form of communications with the data application computer acting as a host computer. Eventually the agent sends a request to be made available signal to the data base application computer (action block 319) and the data base application computer informs the MIS that the agent is now available (action block 321). The data base application computer also informs the call management application server that agent is available (action block 323).

Figure 4:
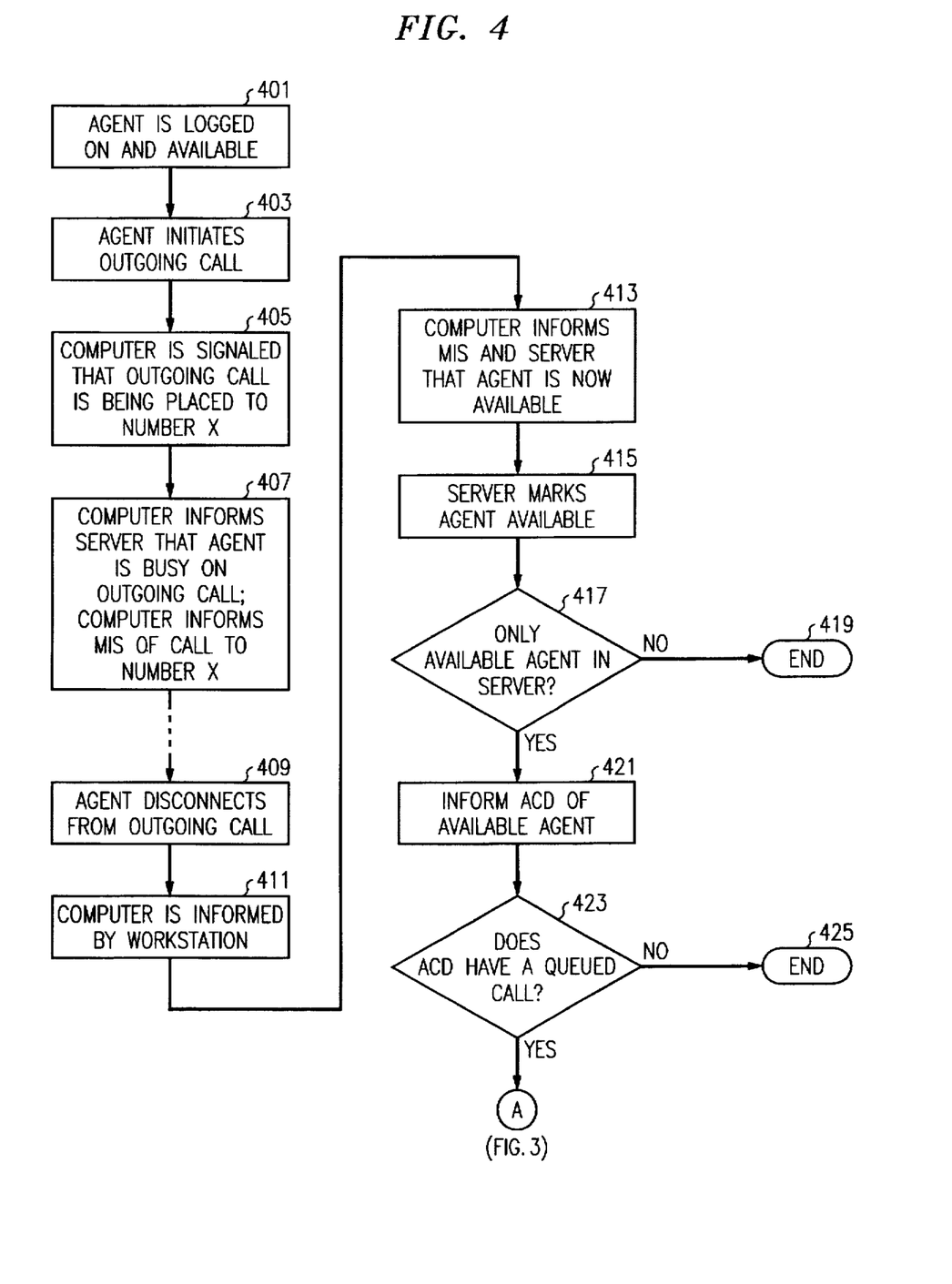

FIG. 4 illustrates the actions performed when the agent makes an outgoing call without logging off. During this time, the agent is not available for receiving incoming calls. In the initial state, the agent is logged on and available (action block 401). The agent then initiates an outgoing call (action block 403). A data message is sent over the data channel to the data application computer that an outgoing call is being placed to number X (action block 405). The data base application computer informs the call management application server that the agent is busy on an outgoing call and also informs the MIS of a call to number X (action block 407). Some time later, the agent disconnects from the outgoing call (action block 409) and the data base application computer is informed by the workstation of the disconnect (action block 411). The data application computer informs the MIS and the call management application server that the agent is now available (action block 413) and marks the agent station available to process new calls (action block 415).

Test 417 then determines whether the newly available agent is the only one available in the call management application server, a situation which might represent the presence of queued calls in the ACD. If the result of test 417 is negative, no further processing is necessary (end block 419). If the result is positive, the call management application server informs the ACD of an available agent station (action block 421). The ACD then tests whether it has at least one queued call (test 423). If not, no further processing is necessary (end block 425). If the result is positive, action block 303 (FIG. 3), previously described, is entered.

Many agents have their own telephone numbers by means of which they may be reached directly on incoming calls. If someone calls the telephone number of an idle remote agent, the call can be accepted and the computer is notified. The data base application computer informs the MIS for record purposes, and informs the call management application server to mark the agent busy. When that call is disconnected, the data base application computer is informed, and the data base application computer informs, the MIS; the MIS records the disconnect. The data base application computer informs the call management application server which makes the agent station available for ACD calls. The agent can also have call waiting for outside (non-ACD calls) on hold. The data application computer is informed of these events, informs the call management application server, and informs the MIS which makes a record. The agent status remains busy in the call management application server in these cases.

Figure 5:
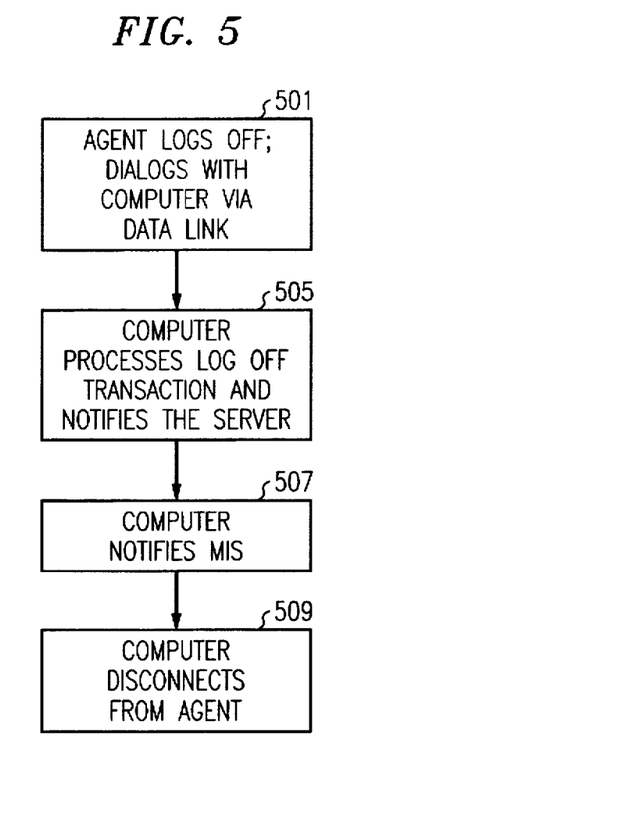

FIG. 5 illustrates the process of logging off. The agent initiates the log off (action block 501). The agent station notifies the data base application computer via the data link of the log off request. The data base application computer processes the log off transaction and notifies call management application server (action block 505). The call management application server marks the agent logged off. The data base application computer notifies the MIS (action block 507). The data base application computer disconnects its data link from the agent (action block 509).

While the preferred embodiment of FIG. 1 shows a server system comprising one call management application server and one data base application computer, in other embodiments a single computer system running the call management application server and the data base application computer as two applications can be used instead.

For large applications a server system 600 (FIG. 6) comprising a plurality of call management application servers 601, . . . , 602 and a plurality of data base application computer 611, . . . , 612, can be used. The various computer systems are interconnected to each other and to the ACD by a data transmission and switching means such as a local area network 620.

Figure 6:
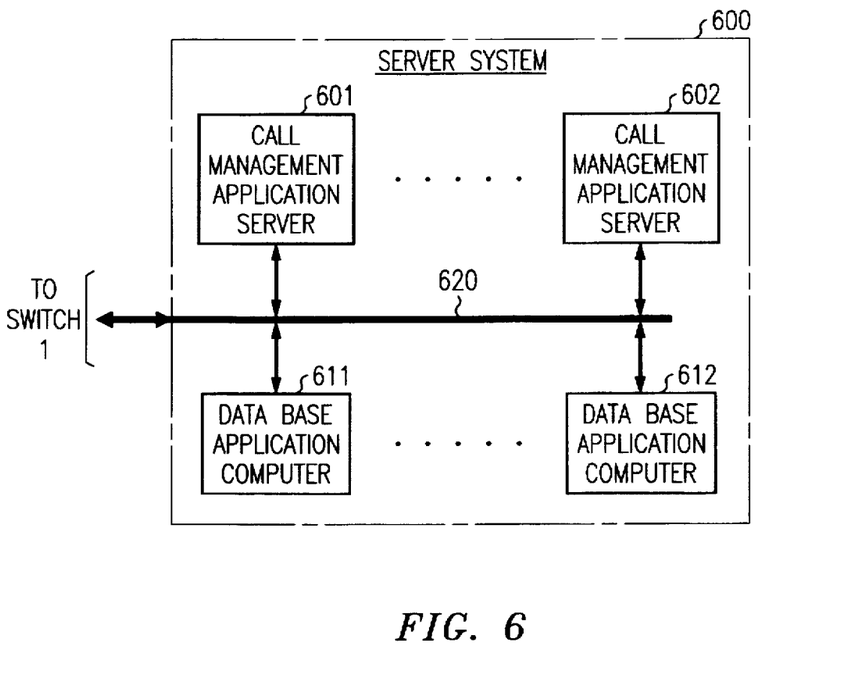
FIG. 6 is a block diagram of an alternative server system.

Information related to products and customers of the ACD is generally stored in a host computer for prior art ACDs. For a system such as that described herein which has one or more data base application computers (20 or 601, . . . , 602), these computers can be used as host computers in addition to carrying out the function of supporting remote agent selection. Even where only one computer is used for the data base application or for both the data base application and the call management application, that computer can be used for the host computer function. Data required for local agent selection is maintained in the switch 1 in applicant's preferred embodiment.

Other embodiments may br designed by those of ordinary skill in the art. This invention is therefore limited only by the claims.

I claim:

1. A method of providing ACD (automatic call distributor) service for a call center, said ACD service provided by a first switching system, from a plurality of agent stations including a serving remote agent station served by a second switching system different from said first switching system, said serving remote agent station being one of one or more remote agent stations serving callers of said call center, said method comprising the steps of:
   establishing data connections from one or more active remote agent stations to a server system for maintaining status information for said remote agent stations;
   responsive to receipt of an incoming ACD call for said ACD system, querying said server system to provide an identification of an available remote agent station;
   responsive to determining in said server system that one or more of said remote agent stations is available, responding from said server system to said first switching system with an identity of one or more available remote agent stations said identities including all identity of said serving remote agent station; and
   extending said incoming call to one of said serving remote agent stations via an audio connection from said first switching system, via said second switching system, and
   responsive to an indication of change of status of a remote agent station of said call center from unavailable to available, sending a message to said call center that a remote agent station is available for serving a call of said call center, said sending a message that a remote agent station is available being performed only if no other remote agent station is available.

2. The method of claim 1 wherein the step of establishing a data connection between a remote agent station and said server system comprises the step of establishing a dial up modem connection between said remote agent station and said first switching system.

3. The method of claim 1 wherein the step of establishing a data connection between a remote agent station and said server system comprises the step of establishing the connection in response to a log on transaction between the remote agent station and said server system.

4. The method of claim 1 further comprising the step of:
   signaling agent station availability, over a data connection between a remote agent station and said server system, for maintaining up to date status information for said remote agent station in said server system.

5. The method of claim 1 wherein said server system further stores product or customer information, further comprising the step of:
   transmitting said product or customer information to said serving remote agent station over the data connection between said server system and said serving remote agent station.

6. An ACD (automatic call distributor) for serving one or more remote agent stations comprising:
   a switch for receiving incoming calls to the ACD;
   a server system for maintaining a status of each of said one or more remote agent stations;
   said switch connectable via a public switched telephone network to each of said plurality of remote agent stations;
   said server system connectable via a data connection to available ones of said plurality of remote agent stations for receiving agent status information;
   said server system connected to said switch for providing an identification of an available remote agent station to said switch only if no other remote agent station is available; and
   said switch for extending a received incoming call for the ACD to the identified available remote agent station via said public switched telephone network.

7. The ACD of claim 6 wherein said server system comprises:
   a data application computer for communicating with said one or more remote agent stations over said data connections for receiving said agent status information; and
   a call management application server for providing said identification of an available remote agent station to said switch.

8. The ACD of claim 7 wherein said data application computer system provides remote agent status updating information to said call management application server and wherein said call management application server maintains status information for said plurality of remote agent stations.

9. The ACD of claim 8 wherein said agent status information maintained in said call management application server comprises data for identifying available remote agent stations.

10. The ACD of claim 8 wherein said data application computer also serves as a host computer for providing to a remote agent station information such as customer data or product data or for accepting customer order information from said remote agent stations.

11. The ACD of claim 6 wherein at least one of said one or more remote agent stations comprises an analog telephone and a data terminal.

12. The ACD of claim 6 wherein at least one of said one or more remote agent stations is an ISDN (integrated services digital network) telephone station.

13. The ACD of claim 6 further comprising one or more of agent stations directly connected to said switch.

14. The ACD of claim 13 wherein said switch is for serving ISDN (integrated services digital network) lines and ones of said one or more directly connected stations are ISDN stations.

15. The ACD of claim 6 further comprising a MIS (management information system) for maintaining management information related to said remote agent stations and wherein said server system provides data for use by said MIS.

16. The ACD of claim 15 wherein said ACD further comprises a plurality of local agent stations served by said switch and wherein said MIS further maintains management information related to said one or more local agent stations.

17. The ACD of claim 6 wherein said server system further performs a dialogue with said one or more remote agent stations to receive and process log on and log off requests.

18. The ACD of claim 6 wherein said server system comprises a plurality of data application computers.

19. The ACD of claim 6 wherein said server system comprises a plurality of call management application servers.

20. A method of providing ACD (automatic call distributor) service for a call center, said ACD service provided by a first switching system, from a plurality of agent stations including a serving remote agent station served by a second switching system different from said first switching system, said serving remote agent station being one of one or more remote agent stations serving callers of said call center, said method comprising the steps of:

establishing data connections from one or more active remote agent stations to a server system for maintaining status information for said remote agent stations;

responsive to receipt of an incoming ACD call for said ACD system, querying said server system to provide an identification of an available remote agent station;

responsive to determining in said server system that one or more of said remote agent stations is available, responding from said server system to said first switching system with an identity of one or more available remote agent stations said identities including all identity of said serving remote agent station; and extending said incoming call to one of said serving remote agent stations via an audio connection from said first switching system, via said second switching system and responsive to all indication of change of status of a remote agent station of said call center from unavailable to available, sending a message to said call center that a remote agent station is available for serving a call of said call center performance of said sending a message being based on the availability status of other remote stations.

21. The method of claim 20 wherein the step of establishing a data connection between a remote agent station and said server system comprises the step of establishing a dial up modem connection between said remote agent station and said first switching system.

22. The method of claim 20 wherein the step of establishing a data connection between a remote agent station and said server system comprises the step of establishing the connection in response to a log on transaction between the remote agent station and said server system.

23. The method of claim 20 further comprising the step of:

signaling agent station availability, over a data connection between a remote agent station and said server system, for maintaining up to date status information for said remote agent station in said server system.

24. The method of claim 20 wherein said server system further stores product or customer information, further comprising the step of:

transmitting said product or customer information to said serving remote agent station over the data connection between said server system and said serving remote agent station.

* * * * *